United States Patent [19]

Deloye et al.

[11] Patent Number: 5,465,332
[45] Date of Patent: Nov. 7, 1995

[54] SELECTABLE 8/16 BIT DMA CHANNELS FOR "ISA" BUS

[75] Inventors: Michael J. Deloye, Boynton Beach; Daniel P. Fuoco; Dennis L. Moeller, both of Boca Raton, all of Fla.

[73] Assignee: International Business Machines Corporation, Armonk, N.Y.

[21] Appl. No.: 947,680

[22] Filed: Sep. 21, 1992

[51] Int. Cl.⁶ .......................... G06F 13/28; G06F 13/00; H01J 3/00
[52] U.S. Cl. .............. 395/842; 364/242.31; 364/242.32; 364/242.33; 364/DIG. 1; 395/846; 395/887; 395/307
[58] Field of Search ...................... 395/425, 275; 364/200 MS File, 900 MS File, 242.31, 242.32, 242.33

[56] References Cited

U.S. PATENT DOCUMENTS

| | | | |
|---|---|---|---|
| 4,466,055 | 8/1984 | Kinoshita et al. | 395/800 |
| 4,467,447 | 8/1984 | Takahashi et al. | 395/425 |
| 4,514,808 | 4/1985 | Murayama et al. | 395/425 |
| 4,646,232 | 2/1987 | Chang et al. | 395/325 |
| 4,849,875 | 7/1989 | Fairman et al. | 395/400 |
| 4,878,166 | 10/1989 | Johnson et al. | 395/425 |
| 4,891,752 | 1/1990 | Fairman et al. | 395/425 |
| 5,043,877 | 8/1991 | Berger et al. | 395/325 |
| 5,101,339 | 3/1992 | Fairman et al. | 395/400 |
| 5,109,521 | 4/1992 | Culley | 395/800 |
| 5,125,088 | 6/1992 | Culley | 395/500 |

FOREIGN PATENT DOCUMENTS

| | | |
|---|---|---|
| 0026083 | 1/1981 | European Pat. Off. . |
| 275945 | 2/1990 | Germany . |
| 58-8340 | 1/1983 | Japan . |
| 61-175750 | 8/1986 | Japan . |
| 2211325 | 6/1989 | United Kingdom . |

OTHER PUBLICATIONS

IBM Technical Disclosure Bulletin Entitled "Direct Memory Access Controller" by S. E. Edick, Mar. 1984, No. 10A, vol. 26, pp. 5199–5206.

*Primary Examiner*—David L. Robertson
*Assistant Examiner*—Frank J. Asta
*Attorney, Agent, or Firm*—D. E. McConnell; A. N. Magistrale

[57] ABSTRACT

In a personal computing system the function of the DMA controllers in the "AT" or "ISA" bus has been modified so that the system may select whether the 16-bit DMA channels are to be used as 8-bit DMA channels or 16-bit DMA channels. An 8/16-bit mode bit for each of the 16-bit DMA channels is written in a control register during the system Power On Self Test routine. Once the mode bit is written for each of the three 16-bit DMA channels, it may be read when the channel is active to select whether the channel is to operate as an 8-bit or 16-bit channel. With this mode bit information available, the page addressing may be selectively changed from 128k size pages to 64k size pages when a 16-bit DMA channel is to be converted to 8-bit. In addition, the byte addressing within a page may be changed from two byte addressing during 16-bit mode to single byte addressing during 8-bit mode.

9 Claims, 3 Drawing Sheets

SELECTABLE 8/16 BIT DMA CHANNELS FOR "ISA" BUS

FIELD AND BACKGROUND OF THE INVENTION

This invention relates to I/O bus architecture exemplified by the IBM PERSONAL COMPUTER AT and other "IBM compatible" machines. This bus architecture is known as the "AT" bus or "Industry Standard Architecture (ISA)" bus. More particularly this invention is directed to an improvement in the interaction between the Direct Memory Access (DMA) Controller and the ISA bus to provide more flexibility in the use of 8-bit and 16-bit DMA channels.

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Many of these systems use an I/O bus architecture exemplified by the IBM PERSONAL COMPUTER AT and other "IBM compatible" machines. This bus architecture is referred to in this description as the "AT bus" or "ISA bus". This bus architecture is generally known, having been described both in technical manuals available from IBM and in more popularized texts such as The Winn Rosch Hardware Bible (Brady, N.Y., 1989). The interested reader is referred to those texts for further detailed information about this bus architecture.

As personal computer technology has developed and moved from eight to sixteen and eventually thirty two bit wide bus interaction and higher speed microprocessors, performance capability has been sought by separating the architecture of the personal computer into varying bus areas. More specifically, in the original IBM PC, what came to be known as the expansion bus was essentially a direct extension of the microprocessor connections, buffered and demultiplexed as required. Later, as the AT bus specification was developed and came into wide use, it became possible to sever the nearly direct connection between the microprocessor and the bus, giving rise to the presence of what became known as the local processor bus and the renaming of the expansion bus as the input/output (or I/O) bus. Typically, in order to enhance performance, the local processor bus runs at a higher clock speed than does the input/output bus. The IBM AT architecture also opened the possibility of running more than one microprocessor on the input/output bus, through use of direct memory access (DMA) interrupts.

The AT bus is designed with 8 DMA channels—four 8-bit DMA channels and four 16-bit DMA channels. One of the 16-bit DMA channels is reserved for communication between DMA chips leaving three 16-bit DMA channels available for use with I/O devices. As adapters, chips and other peripheral devices were developed for attachment to the DMA channels, many more peripheral devices were designed for the 8-bit DMA channel than the 16-bit DMA channel. Further some of the more sophisticated chips using 8-bit DMA channels consume as many as three of the channels with one chip. A system using such a chip has its 8-bit channels quickly committed and unavailable for use by other devices, while at the same time having three 16-bit DMA channels that possibly go unused.

BRIEF DESCRIPTION OF THE INVENTION

It is the object of this invention to provide the user with the ability to selectively convert one or more of the three 16-bit DMA channels in the ISA bus to an 8-bit DMA channel.

In accordance with this invention the above object is accomplished by first storing an 8/16-bit mode bit for each of the 16-bit DMA channels. This mode bit may be written as part of the power-on routine for the system. With this mode information available, the page addressing may be selectively changed from 128k byte (128 kB) size pages to 64kB size pages when a 16-bit DMA channel is to be converted to 8-bit. In addition, the mode information is also used to switch the byte addressing within a page from two byte addressing during 16-bit mode to single byte (one byte contains 8-bits) addressing during 8-bit mode.

The great advantage of this invention is that the user may reconfigure a personal computing system with an ISA bus to have as many as seven 8-bit DMA channels if desired. Further, the three 16-bit DMA channels converted to 8-bit DMA channels are easily reconfigured to 16-bit channels if system hardware so requires.

Other objects, advantages and features of the invention will be understood by those of ordinary skill in the art after referring to the complete written description of the preferred embodiments in conjunction with the following drawings.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
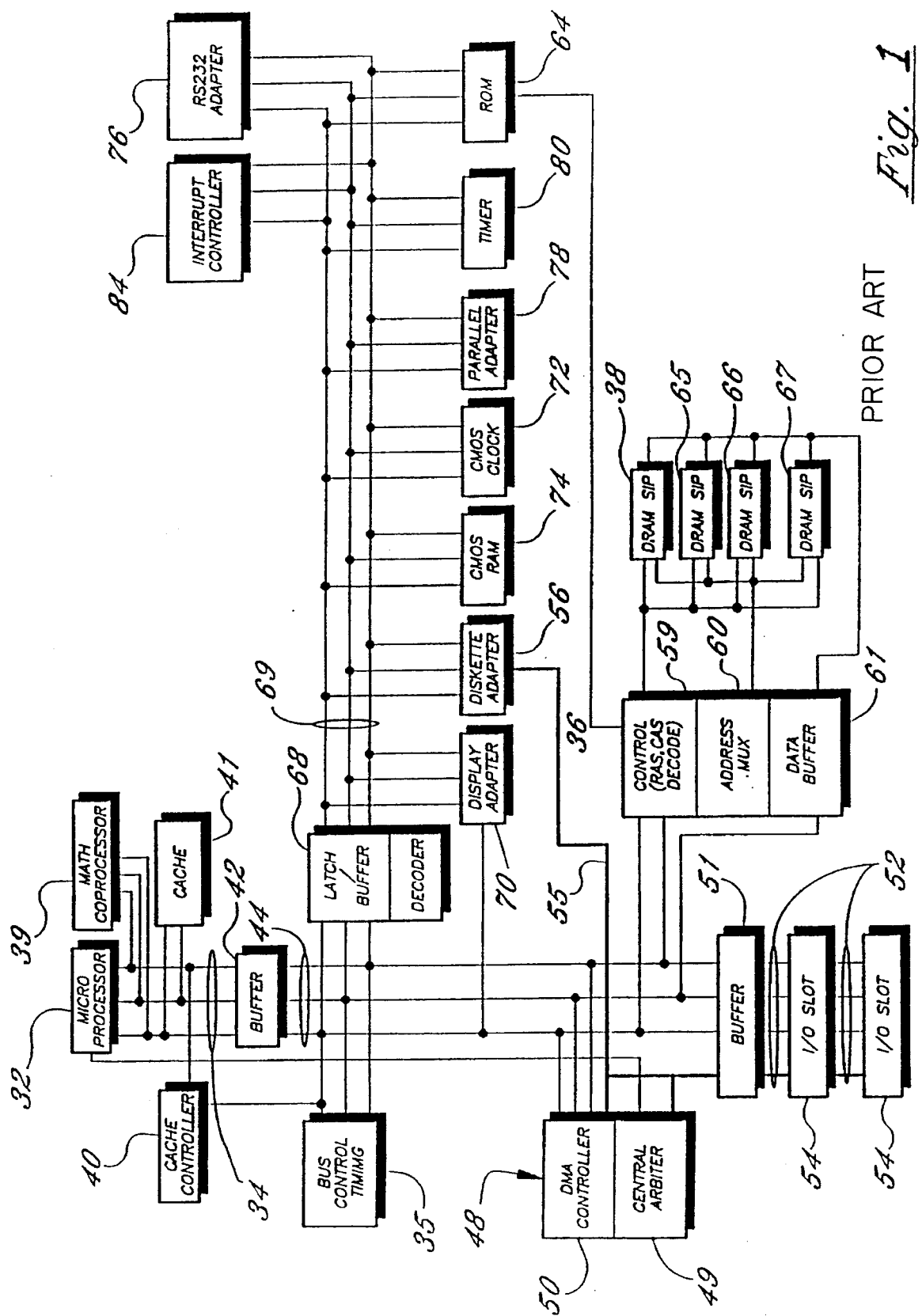
FIG. 1 is a schematic view of a personal computer containing the AT or ISA bus architecture.

Prior to relating the personal computer structure to the present invention, a summary of the operation in general of prior art personal computers may be helpful. Referring to FIG. 1, there is shown a block diagram of a prior art personal computer system illustrating the various components of the computer system including components mounted on the planar and the connection of the planar to the I/O slots and other hardware of the personal computer system. Connected to the planar is the system processor 32 comprised of a microprocessor which is connected by a high speed CPU local bus 34 through a bus control timing unit 35 to a memory control unit 36 which is further connected to a volatile random access memory (RAM) 38. While any appropriate microprocessor can be used, one suitable microprocessor is the 80386 which is sold by INTEL.

While the present invention is described hereinafter with particular reference to the system block diagram of FIG. 1, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 1, the CPU local bus 34 (comprising data, address and control components) provides for the connection of the microprocessor 32, a math coprocessor 39, a cache controller 40, and a cache memory 41. Also coupled on the CPU local bus 34 is a buffer 42. The buffer 42 is itself connected to a slower speed (compared to the CPU local bus) system bus 44, also comprising address, data and control components. The system bus 44 extends between the buffer 42 and a further buffer 68. The system bus 44 is further connected to a bus control and timing unit 35 and a DMA unit 48. The DMA unit 48 is comprised of a central arbitration unit 49 and DMA controller 50. The buffer 51 provides an interface between the system bus 44 and an optional feature bus such as the AT bus 52. Connected to the bus 52 are a plurality of I/O slots 54 for receiving adapter cards which may be further connected to an I/O or peripheral device or memory. An arbitration control bus 55 couples the DMA controller 50 and central arbitration unit 49 to the I/O slots 54 and a diskette adapter 56. Also connected to the system bus 44 is a memory control unit 36 which is comprised of a memory controller 59, an address multiplexor 60, and a data buffer 61. The memory control unit 36 is further connected to a random access memory as represented by the RAM module 38. The memory controller 36 includes the logic for mapping addresses to and from the microprocessor 32 to particular areas of RAM 38. This logic can be used to reclaim RAM previously occupied by BIOS. Further generated by memory controller 36 is a ROM select signal (ROMSEL), that is used to enable or disable the ROM 64. While the microcomputer system is shown with a basic one megabyte RAM module, it is understood that additional memory can be interconnected as represented in FIG. 1 by the optional memory modules 65 through 67.

A latch buffer 68 is coupled between the system bus 44 and a planar I/O bus 69. The planar I/O bus 69 includes address, data, and control components respectively. Coupled along the planar I/O bus 69 are a variety of I/O adapters and other components such as the display adapter 70 (which is used to drive the monitor 11), a CMOS clock 72, nonvolatile CMOS RAM 74 referred to as NVRAM, a RS232 adapter 76, a parallel adapter 78, a plurality of timers 80, a diskette adapter 56, an interrupt controller 84, and a read only memory (ROM) 64. The read only memory 64 includes the BIOS that is used to interface between the I/O devices and the operating system of the microprocessor 32. BIOS stored in the ROM 64 can be copied into the RAM 38 to decrease the execution time of BIOS. The ROM 64 is further responsive (via ROMSEL signal) to the memory controller 36. If the ROM 64 is enabled by the memory controller 36, BIOS is executed out of ROM. If the ROM 64 is disabled by the memory controller 36, ROM is not responsive to address enquiries from the microprocessor 32 (i.e. BIOS is executed out of RAM).

The local processor bus 34 is where the system processor or CPU, any numeric coprocessor provided, and a processor support chip reside; the I/O or option bus 52 is where adapter cards reside; and the planar I/O bus 69 is the bus which is also known as the XD bus. The interface specifications for each of these three busses differ from either of the other two, as will be well known to computer system designers working with the AT bus specification.

Figure 2:
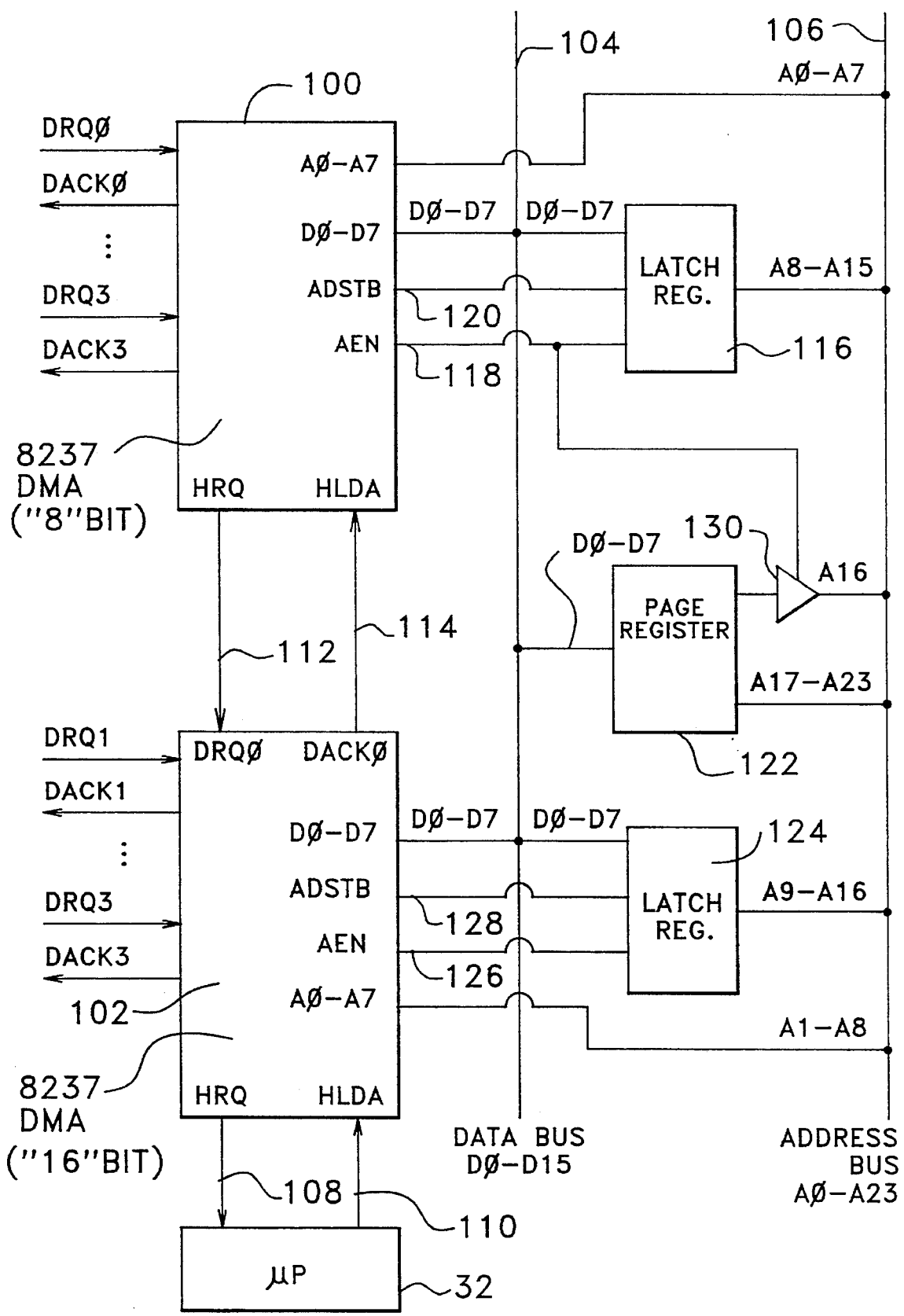
FIG. 2 illustrates the interaction between DMA apparatus and the AT bus in the prior art.

With this background for the AT or ISA bus architecture, the prior art DMA interaction with the AT bus is now described with reference to FIG. 2. The AT bus uses two DMA chips, 8237's sold by Intel. The 8-bit DMA 100 contains both the DMA arbiter and the DMA controller for 8-bit peripheral devices attached to the DMA channels 0–3. The 16-bit DMA 102 contains both the DMA arbiter and DMA controller for four 16-bit DMA channels 4–7. DMA channels 5, 6 and 7 may be attached to 16-bit peripheral devices. DMA channel 4 is reserved for the purpose of cascading DMA 100 and DMA 102 in their communication with microprocessor 32 when requesting a DMA cycle. DMA 102 is the master DMA, while DMA 100 is the slave DMA.

Each DMA channel contains a DMA Request (DRQ) line and a DMA Acknowledge (DACK) line. DMA channels 0–3 correspond to DRQ0–DRQ3 lines respectively in DMA 100, while DMA channels 5, 6 and 7 correspond to DRQ1–DRQ3 lines respectively in DMA 102. Lines DRQ0 and DACK0 (DMA channel 4) in DMA 102 are used to cascade DMA 100 and 102 by being connected to the Hold Request (HRQ) and the Hold Acknowledge (HLDA) lines in DMA 100. Since the highest priority channel in the DMA chips is DRQ0 and DACK0, a request from DMA 100 for a DMA cycle on DRQ0 at DMA 102 will get highest priority. In other words DMA channels 0–3 have higher priority than DMA channels 5–7.

As an example of operation, assume a 16-bit device on DMA channel 5 requests DMA operation by putting a signal on its DRQ1 line in master DMA 102. If it wins arbitration among other requests on DRQ lines in the master DMA, the DMA will use the device in conjunction with use of the data bus 104 and address bus 106 to transfer data. DMA 102 requests a DMA cycle from microprocessor 32 over HRQ line 108. When the microprocessor grants the request, it sends a signal over the HLDA line 110. The DMA then performs the Direct Memory Access requested by the device on channel 5.

If an 8-bit device for example on DMA channel 2 requires a DMA operation, it generates a request on its DRQ2 line in slave DMA 100. If it wins arbitration among other requests on DRQ lines in the slave DMA, the slave DMA 100 requests a DMA cycle from master DMA 102 over HRQ line 112. This HRQ is received on DRQ0 (DMA channel 4) of DMA 102. DRQ0 has highest priority in the master DMA, and therefore, DMA 102 requests a DMA cycle from the microprocessor 32 over HRQ line 108. The microprocessor grants the request over HLDA line 110 at DMA 102. DMA 102 passes the grant to DMA 100 over HLDA line 114. If DMA channel 2 wins arbitration among other requests on DRQ lines in slave DMA 100, DMA 100 will use the 8-bit device on channel 2 in conjunction with use of the data bus 104 and address bus 106 to transfer data.

The DMA chips 100 and 102 do not buffer data during data transfers. The data is merely put on the 16-bit data bus 104 by one device and gated to another device with read/ write cycles. The address of the devices during the read/write cycles is controlled by one of the DMA chips 100 or 102 depending on whether an 8-bit or 16-bit device is active in the data transfer.

If an 8-bit device is active, the address comes from DMA 100 and microprocessor 32. The address is 24 bits long. Address bits 0–7 are stored in a register in DMA 100 as bits A0–A7. There is a register for each channel and therefore each device. Address bits 8–15 are similarly stored in a register in DMA 100 but as data bits D0–D7. There is a data register for each channel as well. The D0–D7 bits are loaded into latch register 116 when the Address Enable (AEN) signal is present on line 118, and the Address Strobe (ADSTB) signal is present on line 120. Thus D0–D7 bits from DMA 100 become address bits A8–A15 in latch register 116.

Address bits A16–A23 are provided by microprocessor 32 via data bus 104 to page register 122. These 8 bits are provided once at the beginning of a data transfer operation. Thereafter, the data transfer takes place within a 64kB address space per page where the page address is defined by A16–A23 and byte addresses within the page are defined by A0–A15.

If a 16-bit device is active, the address comes from DMA 102 and microprocessor 32. The address is a 24 bits long. Address bits 0-7 are stored in a register in DMA 102 as bits A1–A8 (rather than A0–A7). Address A0 is always presumed to be 0. This permits the AT bus to use two-byte data transfers and enlarges the page address space from 64k to 128k as explained shortly. There is a register for each channel and therefore each device. Address bits 9–16 are similarly stored in a register in DMA 100 but as data bits D0–D7. There is a data register for each channel as well. The D0–D7 bits are loaded into latch register 124 when the Address Enable (AEN) signal is present on line 126 and the Address Strobe (ADSTB) signal is present on line 128. Thus D0–D7 bits from DMA 100 become address bits A9–A16 in latch register 116.

Address bits A17–A23 are provided by microprocessor 32 via data bus 104 to page register 122. These 7 bits are provided once at the beginning of a data transfer operation. Thereafter, the data transfer takes place within a 128kB page address space where the page address is defined by A17–A23, and byte addresses within the page are defined by A1–A16. Address bit A16 from page register 122 is blocked by gate 130. Gate 130 is inhibited because the AEN signal on line 118 is absent since DMA 100 is inactive.

Figure 3:
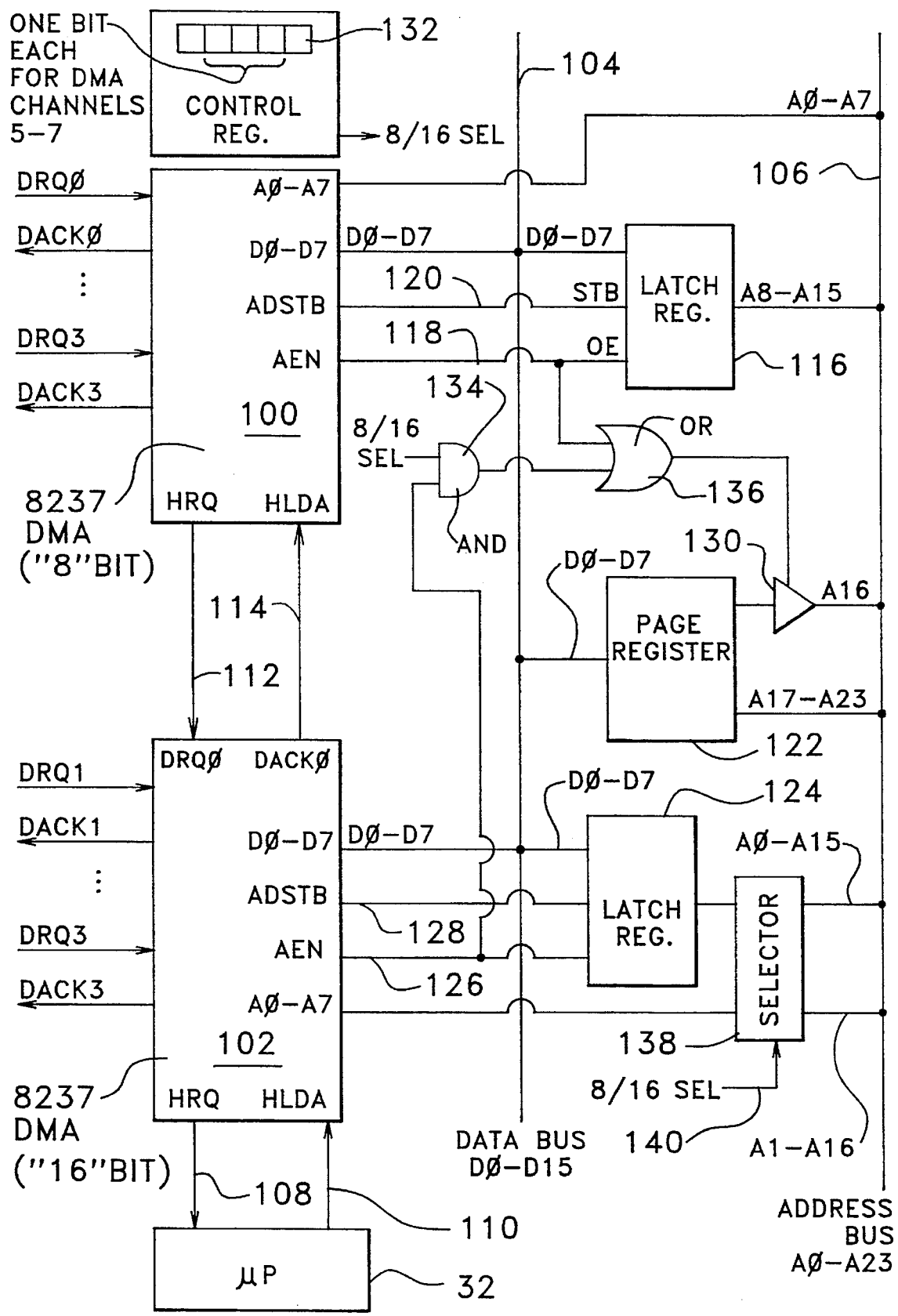
FIG. 3 shows the preferred embodiment of the invention with selectable 8-bit/16-bit interaction between DMA apparatus and the AT bus.

The preferred embodiment of the invention is shown in FIG. 3. The interaction between the DMA's and the AT bus have been modified so that the system may select whether DMA channels 5, 6 and 7 operate as 8-bit DMA channels or 16-bit DMA channels. A control register 132 in the system control registers stores an 8-bit or 16-bit mode or select bit for each of the DMA channels 5, 6 and 7. This mode bit for each of the channels is preferably set by a write command in the system POST program routine. The POST routine is the Power On Self Test routine that is executed when the computer is turned on. The mode bits to select 8/16-bit mode for DMA channels 5–7 could be written by other routines as well, but POST is the preferred routine as that is when the system is being configured. Once the mode bit is written for each of the three 16-bit DMA channels, it may be read, when the channel is active, to select whether the channel is to operate as an 8-bit or 16-bit channel. To switch a 16-bit DMA channel provided by DMA 102 to an 8-bit channel, the following actions must be taken—(1) the address bits from page register 122 must be used as 64kB page addressing rather than as 128k page addressing, (2) the address bits from DMA 102 must address each byte from addresses A0–A15 rather than each word (two bytes) from addresses A1–A16.

To change the size of the page used by DMA 102 when the 8-bit mode signal is present, the Address Enable (AEN) signal on line 126 from DMA 102 is used to enable gate 130 to pass the A16 address bit from page register 122 to address bus 106. The AEN signal is passed by AND 134 only if the 8-bit mode signal is present from control register 132 for the active DMA channel. OR 136 passes the AEN signal to gate 130. OR 136 is provided because an 8-bit AEN signal may come from either DMA 100 or DMA 102 now that DMA 102 is useable as an 8-bit DMA controller.

To change the size of the page used by DMA 102 back to 128kB (16-bit mode), the 16-bit mode bit is read from the control register 132 for the active DMA channel. The 16-bit mode signal inhibits AND 134, and thus the AEN signal from DMA 102 does not enable gate 130. Therefore, only address bits A17–A23 are used from page register 122; i.e. 128kB storage space, page addressing.

To change the address bits from a two byte address space interval to one byte interval, selector 138 is provided. Selector 138 is a switching matrix that in 16-bit mode selects the address bits A0–A7 from DMA 102 as address bits A1–A8 and the D0–D7 bits in latch register 124 as address bits A9–A16. In 8-bit mode, selector 138 switches the address lines so that A0–A7 from DMA 102 are address bits A0–A7, and the D0–D7 bits on lines from latch register 124 are address bits A8–A15. The 8/16 select line is the 8-bit/16-bit mode bit read from control register 132 for the active DMA channel.

While a number of preferred embodiments of the invention have been shown and described, it will be appreciated by one skilled in the art, that a number of further variations or modifications may be made without departing from the spirit and scope of our invention.

What is claimed is:

1. In a personal computer having both 8-bit and 16-bit DMA channels, apparatus for selectively converting the 16-bit DMA channels to 8-bit DMA channels comprising:

storage means for storing an 8-bit/16-bit mode signal for a 16-bit DMA channel for selecting whether said 16-bit channel is to operate as an 8-bit or 16-bit channel, said mode signal remaining set in one of said 8-bit or 16-bit modes while said 16-bit DMA channel is active such that said 16-bit DMA channel operates as an 8-bit or 16-bit channel throughout its active cycle;

page address means responsive to the stored mode signal for said channel for addressing a 64kB storage space if the mode signal is 8-bit mode and for addressing a 128kB storage space if the mode signal is 16-bit mode;

byte address means responsive to the stored mode signal for said channel for addressing a 64kB storage space in one byte intervals if the mode signal is 8-bit mode and for addressing a 128kB storage space in two byte intervals if the mode signal is 16-bit mode.

2. The apparatus of claim 1 wherein said byte address means comprises:

DMA means for providing 16 address bits;

selector means responsive to the stored mode signal in 8-bit mode for switching the 16 address bits from said DMA means in order to address storage space with the lowest order 16 bits, the 16 bits defining a one byte address within the 64kB storage space at the page address provided by said page address means; and said selector means responsive to the stored mode signal in 16-bit mode for switching the 16 address bits from said DMA means in order to address storage space with the lowest order 17 bits, the lowest order bit always being zero, the 17 bits therefore defining a two byte word address within the 128kB storage space at the page address provided by said page address means.

3. The apparatus of claim 2 wherein said page address means comprises:

page register means for addressing storage space starting with 17th address bit (A16) and higher;

gating means responsive to the stored mode in 8-bit mode for passing the 17th address bit as the lowest order bit in the page address; and said gating means responsive to the stored mode in 16-bit mode for inhibiting the passage of the 17th address bit as the lowest order bit in the page address whereby the 18th bit (A17) becomes the lowest order bit in the page address.

4. The apparatus of claim 1, wherein said storage means further comprises means for storing a separate 8-bit/16-bit mode signal for each of said 16-bit DMA channels such that each of said 16-bit DMA channels may be selectively converted to an 8-bit DMA channel when its corresponding mode signal is in 8-bit mode.

5. In a personal computing system having an AT or ISA bus architecture, apparatus for selectively switching 16-bit DMA channels between operation as 16-bit DMA channels and operation as 8-bit DMA channels, said apparatus comprising:

register means for storing at least one 8-bit/16-bit mode bit for at least one of the 16-bit DMA channels for selecting whether said at least one 16-bit channel is to operate as an 8-bit or 16-bit channel, said at least one mode bit remaining set in one of said 8-bit or 16-bit modes while said at least one 16-bit DMA channel is active such that said at least one 16-bit DMA channel operates as an 8-bit or 16-bit channel throughout its active cycle;

16-bit DMA control means responsive to a 16-bit mode bit for addressing 64kB addresses with a two byte storage space at each address;

paging means responsive to said DMA control means and a 16-bit mode bit for inhibiting the addressing of a 64kB storage space and enabling the addressing of an 128kB storage space;

said DMA control means responsive to an 8-bit mode bit stored in said register means for addressing 64kB addresses with a single byte storage space at each address;

said paging means responsive to said DMA control means and a 8-bit mode bit for enabling the addressing of a 64kB storage space and inhibiting the addressing of an 128kB storage space.

6. The apparatus of claim 5 wherein said DMA control means comprises:

DMA address register means for providing 8 address bits;

DMA data register means for providing an additional 8 address bits whereby 16 address bits are provided;

selector means responsive to the 8-bit mode bit for switching the 16 address bits from both of said DMA register means in order to address storage space with the lowest order 16 bits, the 16 bits defining a one byte address within the 64kB storage space at the page address provided by said page address means; and said selector means responsive to the 16-bit mode bit for switching the 16 address bits from both of said DMA register means in order to address storage space with the lowest order 17 bits, the lowest order bit always being zero, the 17 bits therefore defining a two byte word address within the 128kB storage space at the page address provided by said page address means.

7. The apparatus of claim 6 wherein said paging means comprises:

page register means for addressing storage space starting with 17th address bit (A16) and higher;

gating means responsive to the 8-bit mode bit and the 16-bit DMA control means for passing the 17th address bit as the lowest order bit in the page address; and said gating means responsive to the 16-bit mode bit for inhibiting the passage of the 17th address bit as the lowest order bit in the page address whereby the 18th bit (A17) becomes the lowest order bit in the page address.

8. The apparatus of claim 5, wherein said register means further comprises means for storing a separate 8-bit/16-bit mode signal for each of said 16-bit DMA channels such that each of said 16-bit DMA channels may be selectively converted to an 8-bit DMA channel when its corresponding mode signal is in 8-bit mode.

9. In a personal computing system having an "AT" or "ISA" bus architecture designed for attachment to 8-bit or 16-bit peripheral devices, DMA channel apparatus for executing DMA cycles comprising:

a first DMA controller responsive to 8-bit peripheral devices for controlling 8-bit DMA data transfers in one byte address space intervals within a 64k byte storage space;

a second DMA controller coupled to said first DMA controller such that said second DMA controller is responsive to 16-bit peripheral devices for controlling 16-bit DMA data transfers in two byte address space intervals within a 128k byte storage space;

a page register responsive to an active first DMA controller for addressing storage space as pages with each page having 64k bytes of storage space;

said page register responsive to an inactive first DMA controller for addressing storage space as pages with each page having 128k bytes of storage space;

a control register for storing an 8-bit/16-bit mode bit for selecting whether a DMA channel coupled to said second DMA controller is to operate as an 8-bit or 16-bit channel, said mode bit remaining set in one of said 8-bit or 16-bit modes while said DMA channel is active such that said DMA channel operates as an 8-bit or 16-bit channel throughout its active cycle;

said second DMA controller responsive to an 8-bit peripheral device and an 8-bit mode bit from said control register for controlling 8-bit DMA transfers in one byte address space intervals within a 64k byte storage space; and said page register responsive to an active second DMA controller and an 8-bit mode bit from said control register for addressing storage space as pages with each page having 64k bytes of storage space.

* * * * *